(12) United States Patent
Krissell

(10) Patent No.: US 7,287,086 B2
(45) Date of Patent: Oct. 23, 2007

(54) METHODS, SYSTEMS AND COMPUTER PROGRAM PRODUCTS FOR CONTROLLING DATA TRANSFER FOR DATA REPLICATION OR BACKUP BASED ON SYSTEM AND/OR NETWORK RESOURCE INFORMATION

(75) Inventor: Daniel L. Krissell, Morrisville, NC (US)

(73) Assignee: Internatinonal Business Machines Corporation, Armonk, NY (US)

( * ) Notice: Subject to any disclaimer, the term of this patent is extended or adjusted under 35 U.S.C. 154(b) by 734 days.

(21) Appl. No.: 10/616,361

(22) Filed: Jul. 9, 2003

(65) Prior Publication Data

US 2005/0010677 A1    Jan. 13, 2005

(51) Int. Cl.
*G06F 15/16* (2006.01)

(52) U.S. Cl. ...................... 709/232; 709/217

(58) Field of Classification Search ........ 709/200–203, 709/217–233
See application file for complete search history.

(56) References Cited

U.S. PATENT DOCUMENTS

| | | | | |
|---|---|---|---|---|
| 5,212,772 A | | 5/1993 | Masters | 395/200 |
| 5,649,104 A | * | 7/1997 | Carleton et al. | 709/204 |
| 5,758,067 A | | 5/1998 | Makinen et al. | 395/185.07 |
| 5,758,359 A | | 5/1998 | Saxon | 707/204 |
| 5,854,754 A | | 12/1998 | Cabrera et al. | 364/578 |
| 5,920,701 A | | 7/1999 | Miller et al. | 395/200.58 |
| 5,974,563 A | | 10/1999 | Beeler, Jr. | 714/5 |
| 6,014,707 A | * | 1/2000 | Miller et al. | 709/232 |
| 6,038,665 A | | 3/2000 | Bolt et al. | 713/176 |
| 6,073,197 A | * | 6/2000 | Stewart | 710/104 |
| 6,088,732 A | * | 7/2000 | Smith et al. | 709/229 |
| 6,263,201 B1 | | 7/2001 | Hashimoto et al. | 455/403 |
| 6,330,570 B1 | | 12/2001 | Crighton | 707/204 |
| 6,415,027 B1 | | 7/2002 | Malik | 379/221.01 |
| 6,421,688 B1 | | 7/2002 | Song | 707/203 |
| 6,625,623 B1 | * | 9/2003 | Midgley et al. | 707/204 |
| 7,024,529 B2 | * | 4/2006 | Yamada et al. | 711/162 |
| 2002/0049776 A1 | | 4/2002 | Aronoff et al. | 707/200 |
| 2002/0091814 A1 | | 7/2002 | Arendt et al. | 709/223 |
| 2002/0174139 A1 | | 11/2002 | Midgley et al. | 707/204 |
| 2003/0023743 A1 | * | 1/2003 | Raphel et al. | 709/232 |
| 2003/0041074 A1 | | 2/2003 | Vasudevan et al. | 707/204 |

FOREIGN PATENT DOCUMENTS

| | | |
|---|---|---|
| JP | 9237212 | 9/1997 |
| WO | 02/46873 | 6/2002 |
| WO | 03/005158 | 1/2003 |

* cited by examiner

*Primary Examiner*—Moustafa Meky
(74) *Attorney, Agent, or Firm*—Myers Bigel Sibley & Sajovec, P.A.

(57) ABSTRACT

Methods for controlling the periodic data transfer between a first computer processor and a second computer processor include transferring data between the first and second computer processor based on an impact of the transfer on a dynamically determined measure of performance.

13 Claims, 8 Drawing Sheets

METHODS, SYSTEMS AND COMPUTER PROGRAM PRODUCTS FOR CONTROLLING DATA TRANSFER FOR DATA REPLICATION OR BACKUP BASED ON SYSTEM AND/OR NETWORK RESOURCE INFORMATION

FIELD OF THE INVENTION

The present invention relates to controlling data transfer on a data processing system and, more particularly, to controlling data replication or backup operations.

BACKGROUND OF THE INVENTION

In some network environments, data is periodically transferred from one data processor to another data processor. Two examples of instances involving data transfer are data replication and data backup.

Data replication is the process of sharing changes between multiple copies of a single file or data set on multiple data processing systems. For example, two data processing systems can communicate through a network. Both systems on the network can have a copy of the same data. As time progresses, each data processing system updates its copy. After a period of time, the data may not be the same between data processing systems. Replication can be performed to synchronize the data, and any updates to the data can be merged into one common data set.

Accordingly, data replication can allow users on various networks in a variety of locations to share the same information and files. Replication can be performed with replication software applications in a variety of processor relationships, such as client-server, server-server, and peer-peer replication.

Data replication is typically scheduled to occur at specified times. For example, replication can be scheduled to occur at a predetermined frequency, such as every two hours Monday through Friday and every four hours on weekends. However, the scheduling of data replication can disrupt system operations by using system resources. Occasionally, the scheduled data replication can occur at the same time that a data processing system is experiencing a heavy load. During such poorly timed replications, applications that may be running on the data processing system can be slowed. Response time for connecting users to the system may also be increased. In some instances, users may be unable to connect to the data processing system. The performance of applications sharing the same processor resources may also be adversely affected. Occasionally, the diversion of additional resources needed to perform data replication can result in an application failure as a result of low system resources.

Data transfers to back up data typically involve storing a copy of data separately from an original copy. For example, a document on a client data processing system can be saved periodically on a server processor. Many data backup systems are two tiered environments having a client machine with data that is backed up on a server machine. The client is scheduled to send the data to the server at prescheduled times, and the server manages the backed up data.

Data transfers to back up data typically occur at regularly scheduled intervals. If the data backup process is scheduled during a period of high processor use, applications, connection times, and other system performance measures may be adversely effected.

SUMMARY OF THE INVENTION

According to embodiments of the present invention, methods for controlling-the periodic data transfer between a first computer processor and a second computer processor are provided. The first computer processor and the second computer processor comprise a network system. Data is transferred between the first and second computer processor based on an impact of the transfer on a dynamically determined measure of performance.

In some embodiments of the present invention, transferring data between the first and second computer processor based on an impact of the transfer on a measure of performance comprises monitoring a real time availability of a system resource and transferring data between the first and second computer processor based on a comparison of the availability of a system resource to a predetermined threshold. Data can be transferred between the first and second computer processor if a predefined maximum time between transferring data has elapsed irrespective of the availability of the network resource. The transfer of data may be delayed until at least a predefined minimum time has elapsed after a prior data transfer. A resource availability request can be sent from the first computer processor to the second computer processor to determine resource availability. Transferring data between the first and second computer processor can include replicating data and/or backing up data.

The system resource can be usage of the first and/or second computer processor, memory usage of the first and/or second computer processor, central processor unit (CPU) usage of the first and/or second computer processor, an available bandwidth on a network connection or any combination thereof.

While the invention has been described above primarily with respect to the method and data transfer control aspects of the invention, both systems and/or computer program products are also provided.

DETAILED DESCRIPTION

Figure 1:
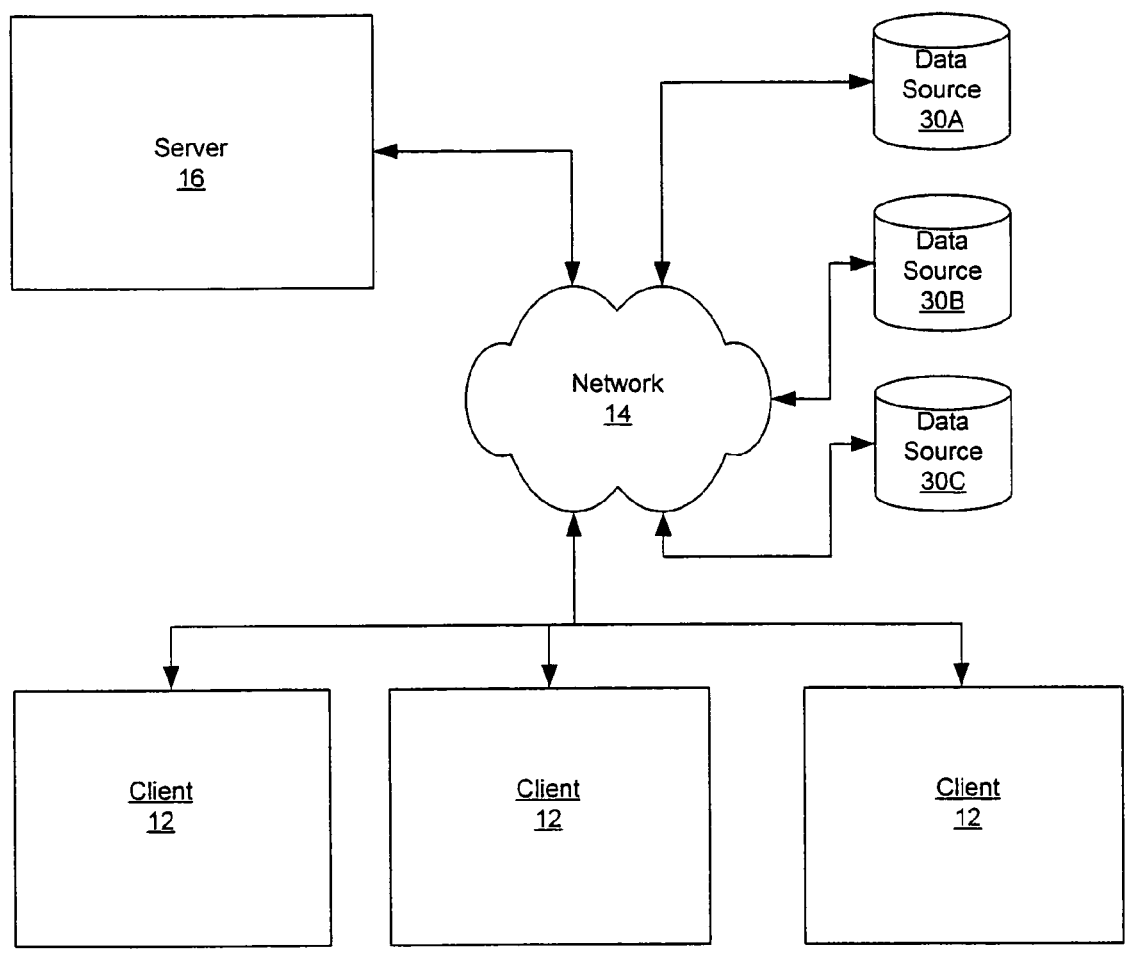
FIG. 1 is a block diagram of a system according to embodiments of the present invention.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by those of skill in the art, the present invention may be embodied as methods, data processing systems, and/or computer program products. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to particular embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

As is described in more detail below, the present invention provides for the control of data transfer operations, such as data replication and backup, between first and second computer processors. According to embodiments of the present invention, data can be transferred between computer processors based on an impact of the transfer on a dynamically determined measure of performance. In some embodiments of the invention, the impact of the transfer on the measure of performance can be determined based on the availability of a resource and a comparison that exceeds a threshold; however, other measures of performance can be used. For example, the availability of a resource and the availability threshold could also be a utilization and a utilization threshold or combinations thereof. Thus, availability includes monitoring utilization and/or the lack of utilization of a resource and does not refer to the present or absence of a resource in its totality.

The first computer processor and the second computer processor comprise a network system. An availability of a system resource is monitored. If the availability of the system resource is greater than a predetermined threshold, data is transferred between the first and second computer processor. Various embodiments of the present invention will now be described with reference to FIGS. 1 through 8.

FIG. 1 illustrates a network environment in which embodiments of the present invention may be utilized. As will be appreciated by those of skill in the art, however, the operations of embodiments of the present invention may be carried out on a single processing system with or without access to a network such as an intranet or the Internet.

As seen in FIG. 1, client data processing system(s) 12, such as a personal computer, laptop computer, pervasive computing device such as a personal data assistant (PDA), smartphone, or other mobile terminal, may communicate over a network 14 to another data processing system which may act as a server 16. The network 14 may be an intranet or the Internet or other networks known to those of skill in the art.

As is further illustrated in FIG. 1, the server 16 can be in communication with data sources 30A, 30B, and 30C. The data sources 30A, 30B, and 30C can be computer servers, processing systems, or other networks that can send data to the client data processing system 12 over the network 14. A user can manipulate or view the data on the client 12.

Figure 2:
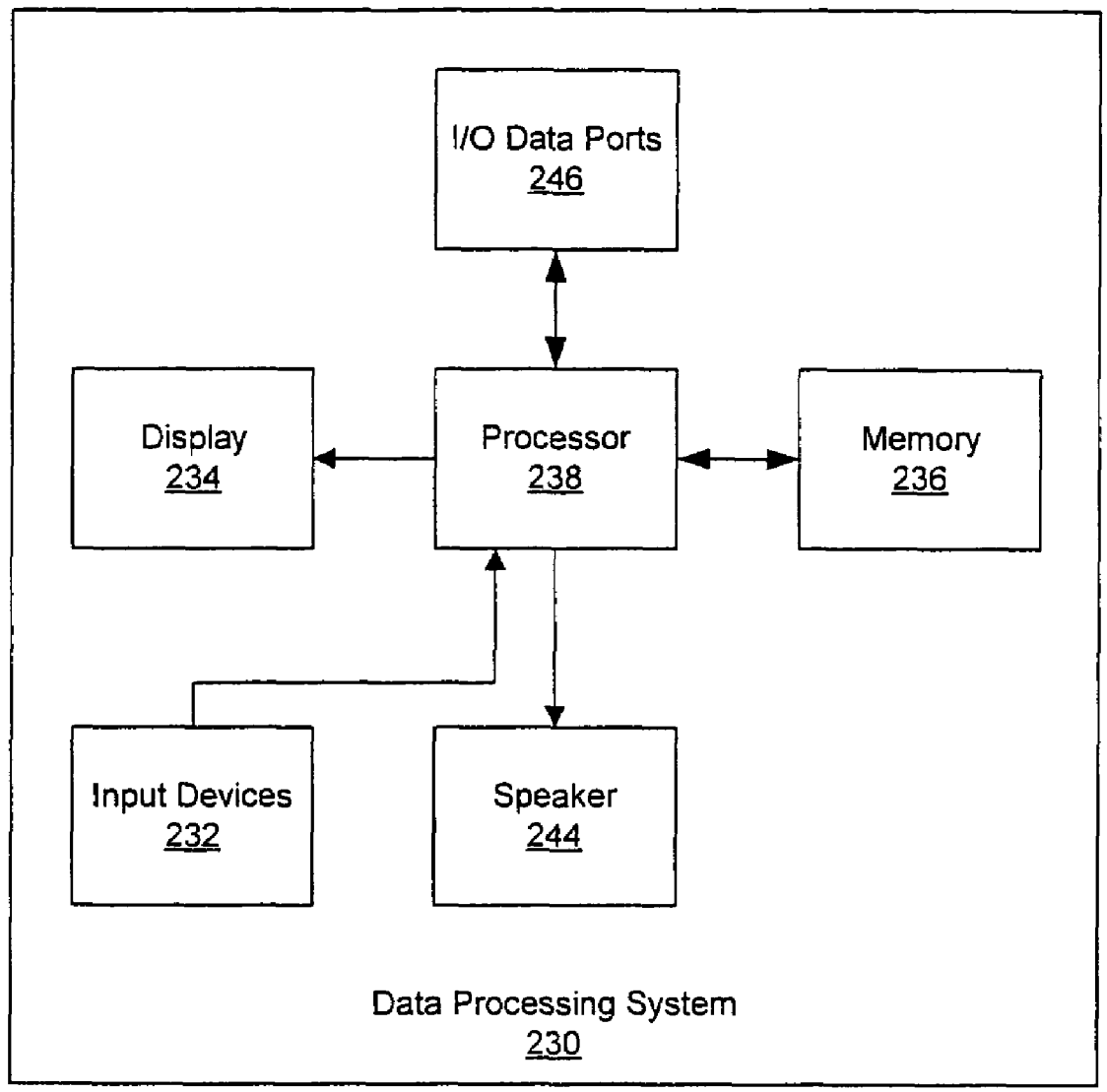
FIG. 2 is a block diagram of a data processing system according to embodiments of the present invention.

Referring to FIG. 2, exemplary embodiments of a data processing system 230 in accordance with embodiments of the present invention typically includes input device(s) 232 such as a keyboard or keypad, touch sensitive screen, light sensitive screen, or mouse, a display 234, and a memory 236 that communicate with a processor 238. The data processing system 230 may further include a speaker 244, and an I/O data port(s) 246 that also communicates with the processor 238. The I/O data port 246 can be used to transfer information between the data processing system 230 and another computer system or a network (e.g., the Internet). These components may be conventional components such as those used in many conventional data processing systems which may be configured to operate as described herein. Furthermore, as will be appreciated by those of skill in the art, the data processing system 230 may be configured as the client 12 or the server 16.

Figure 3:
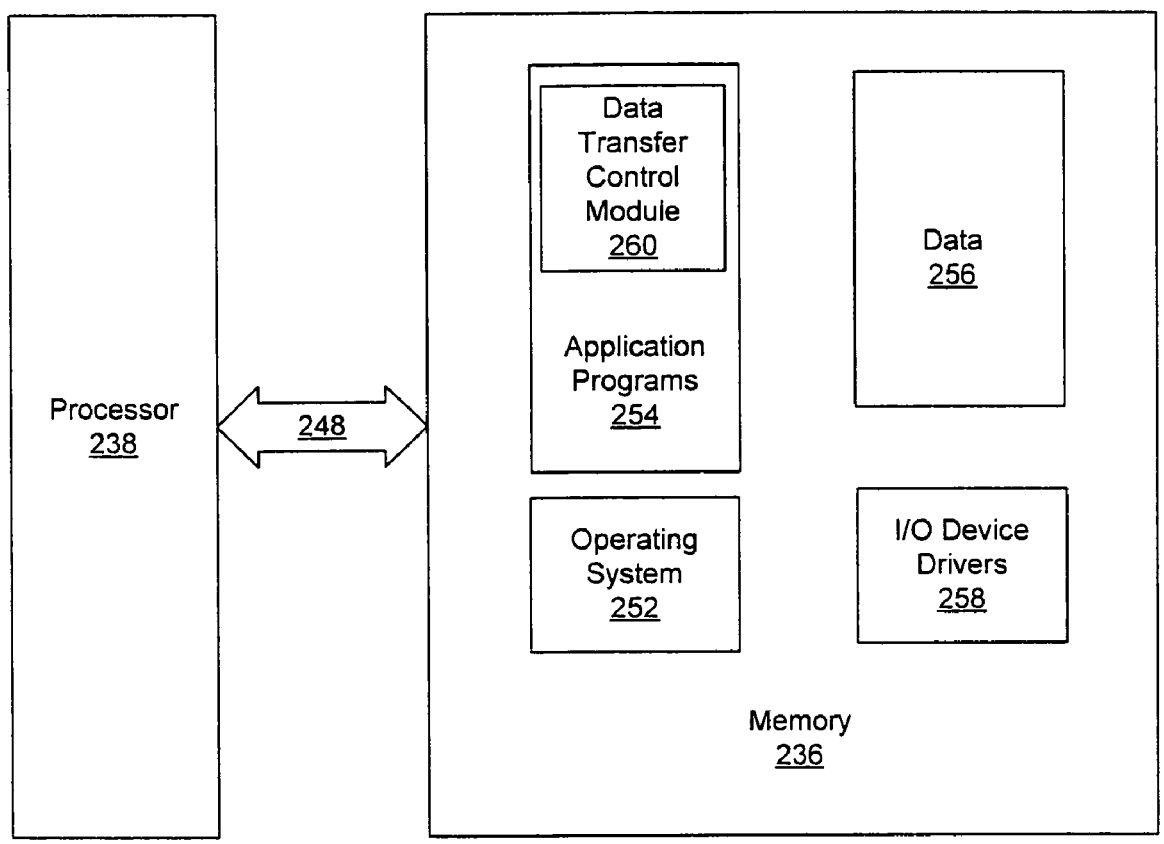
FIG. 3 is a more detailed block diagram of data processing systems according to embodiments of the present invention.

FIG. 3 is a block diagram of embodiments of data processing systems that illustrates systems, methods, and/or computer program products in accordance with the present invention. The processor 238 communicates with the memory 236 via an address/data bus 248. The processor 238 can be any commercially available or custom microprocessor. The memory 236 is representative of the overall hierarchy of memory devices containing the software and data used to implement the functionality of the data processing system 230. The memory 236 can include, but is not limited to, the following types of devices: cache, ROM, PROM, EPROM, EEPROM, flash memory, SRAM, and DRAM.

As shown in FIG. 3, the memory 236 may include several categories of software and data used in the data processing system 230: the operating system 252; the application programs 254; the input/output (I/O) device drivers 258; and the data 256. As will be appreciated by those of skill in the art, the operating system 252 may be any operating system suitable for use with a data processing system, such as OS/2, AIX or System390 from International Business Machines Corporation, Armonk, NY, Windows95, Windows98, Windows2000, or WindowsXP from Microsoft Corporation, Redmond, Wash, Unix or Linux. The I/O device drivers 258 typically include software routines accessed through the operating system 252 by the application program 254 to communicate with devices such as the input devices 232, the speaker 244, the I/O data port(s) 246, and certain components of the memory 236. The application programs 254 are illustrative of the programs that implement the various features of the data processing system 230 and preferably include at least one application which provides the data transfer control aspects of embodiments of the present invention. Finally, the data 256 represents the static and dynamic data used by the application programs 254, the operating system 252, the I/O device drivers 258, and other software programs that may reside in the memory 236.

As is further seen in FIG. 3, the application programs 254 preferably include a data transfer control module 260. The data transfer control module 260 preferably carries out operations as described herein for controlling the transfer of data between processors.

While the present invention is illustrated, for example, with reference to a data transfer control module 260, as will be appreciated by those of skill in the art, the data transfer control module 260 may also be incorporated into other components, such as the operating system 252. Thus, the present invention should not be construed as limited to the configuration of FIG. 3 but is intended to encompass any configuration capable of carrying out the operations described herein.

Figure 4:
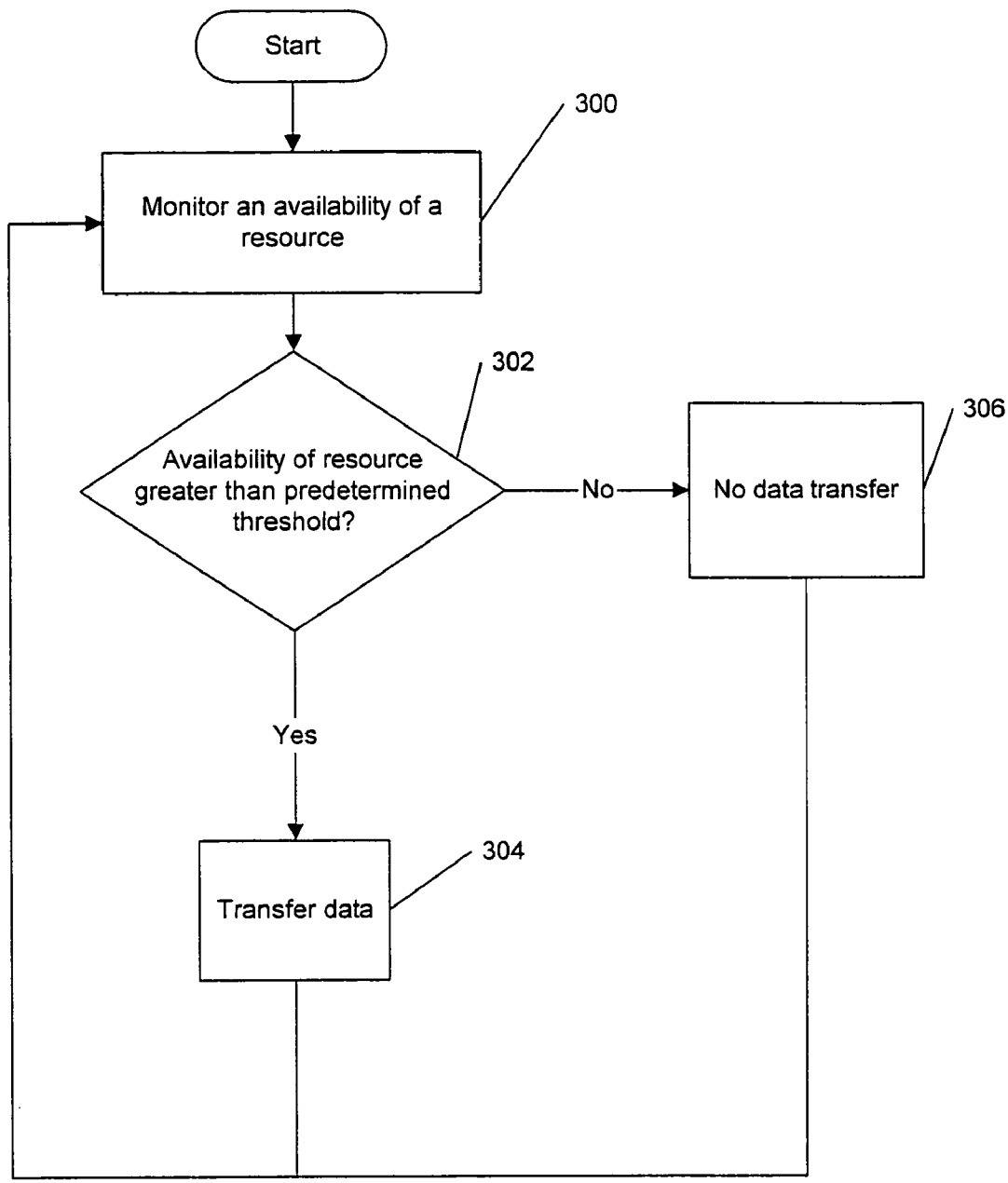
FIGS. 4-8 are flowcharts illustrating operations to control data transfer according to embodiments of the present invention.

Embodiments of the present invention will now be described in more detail with reference to FIG. 4, which is a flowchart illustration of operations that can be carried out by the data transfer control module 260. As seen in FIG. 4, the data transfer control module 260 may monitor an availability of a system resource (Block 300). If the availability of the resource is greater than a predetermined threshold (Block 302), then data is transferred (Block 304). Transferring data (Block 304) can include data transfers to maintain multiple copies of a file in separate memory locations on a system. Examples of data transfer functions that can be performed include data replication (to synchronize multiple copies of files between processors) and backup (to store an updated copy in a different location). If the availability of the resource is less than a predetermined threshold, then no data is transferred (Block 306).

Accordingly, data transfers, such as replication and backup, are performed only if resources are available. The data transfer control module 260 in FIG. 3 can be self-configuring to determine an optimal time to perform data transfers, including data replication and backup.

A threshold amount of available resources that must be available for a data transfer to occur can be a preset value. Alternatively, the data transfer control module 260 can dynamically adjust the threshold amount of resource availability, for example, based on the duration of previous data transfers at a given resource availability. In some embodiments, the threshold can also be determined dynamically by an algorithm analyzing historical data. The system resource can include, for example, memory resource, central processor unit resources, timing resources, and/or bandwidth resources. The threshold can be a percentage of resource being used in real time, and the threshold can include timing information and/or other measurements of resource allocation and usage. Multiple resources may also be monitored and a composite of individual thresholds utilized. Moreover, the threshold can be dynamically adjusted over time. For example, the threshold could be decreased over time after each transfer so that the threshold is higher after a recent data transfer and lower as the time approaches the maximum time between transfers.

Moreover, data transfers can be controlled between two or more computer processors, such as the server 16 and one or more clients 12 as shown in FIG. 1. For example, the data transfer control module 260 (FIG. 3) can reside on the server 16. The server 16 monitors resources, which can include resources that impact the server 16, the client 12, the network 14, or a combination thereof. Alternatively, the data transfer control module 260 can reside on the client 12 or the network 14.

Figure 5:
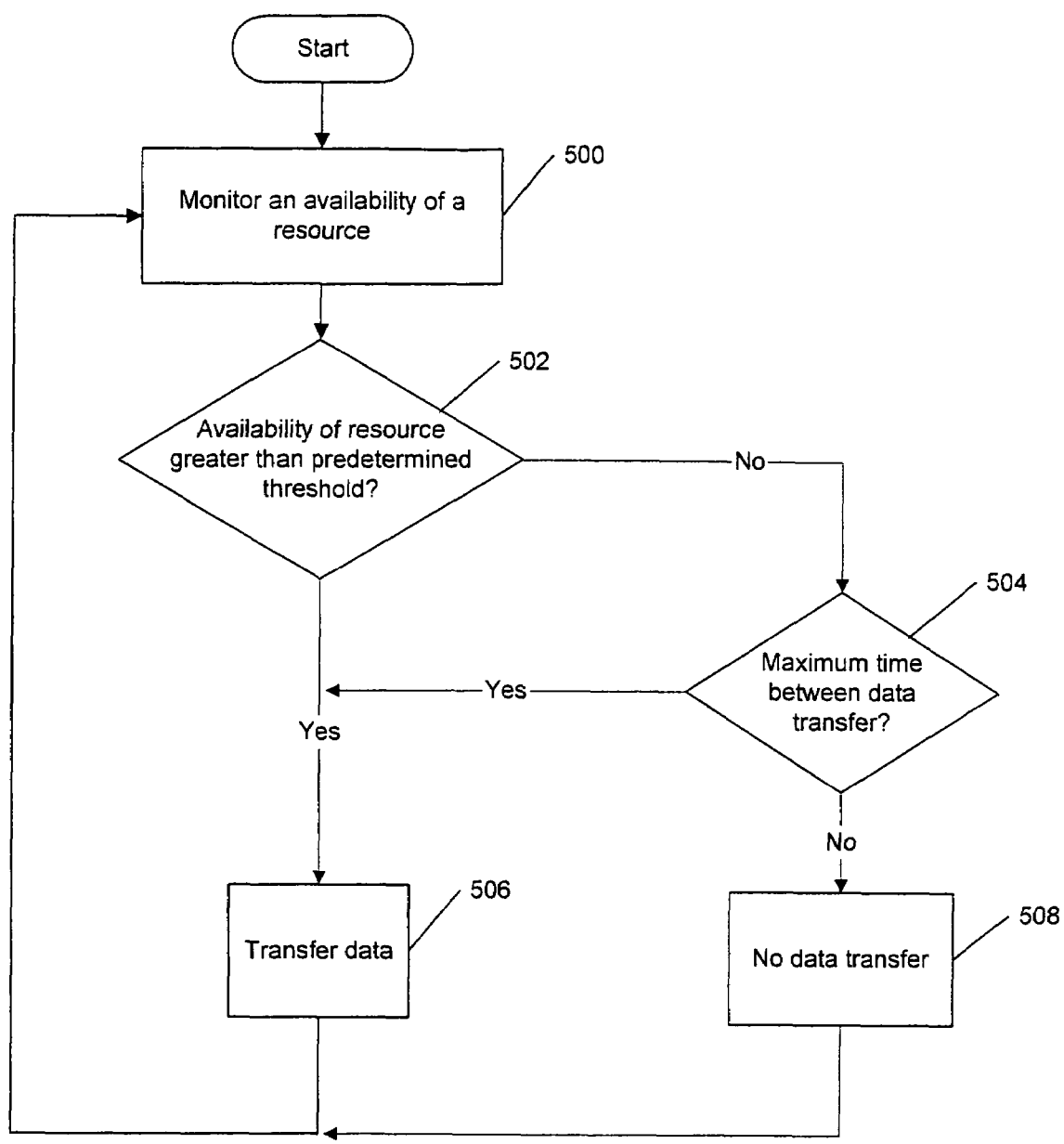

For some data transfer operations such as data replication and backup, it may be desirable for data transfer to occur with a given regularity notwithstanding the availability of system resources. Referring to FIG. 5, operations that can provide data transfers with a maximum time between data transfers are shown. The availability of a system resource is monitored (Block 500). If the availability of a resource is greater than a predetermined threshold (Block 502), then data is transferred (Block 506). However, if the availability of a resource is not greater than the predetermined amount, then the data transfer control module 260 determines if the maximum time between data transfers has been reached (Block 504). For example, the data transfer control module 260 can compare the time duration that has elapsed since the previous data transfer to a predetermined value. If the maximum time is reached, then data is transferred irrespective of resource availability (Block 506). If the maximum time has not been reached since the previous data transfer, then no transfer occurs (Block 508).

Performing some types of data transfer functions periodically, such as data replication and backup, may be necessary for system functionality. As illustrated in FIG. 5, the data transfer generally occurs based on the determination of resource availability (Block 502). However, if a maximum time has been reached, then the data can be transferred regardless of resource availability. Accordingly, data transfer occurs at least as often as the maximum time interval.

Figure 6:
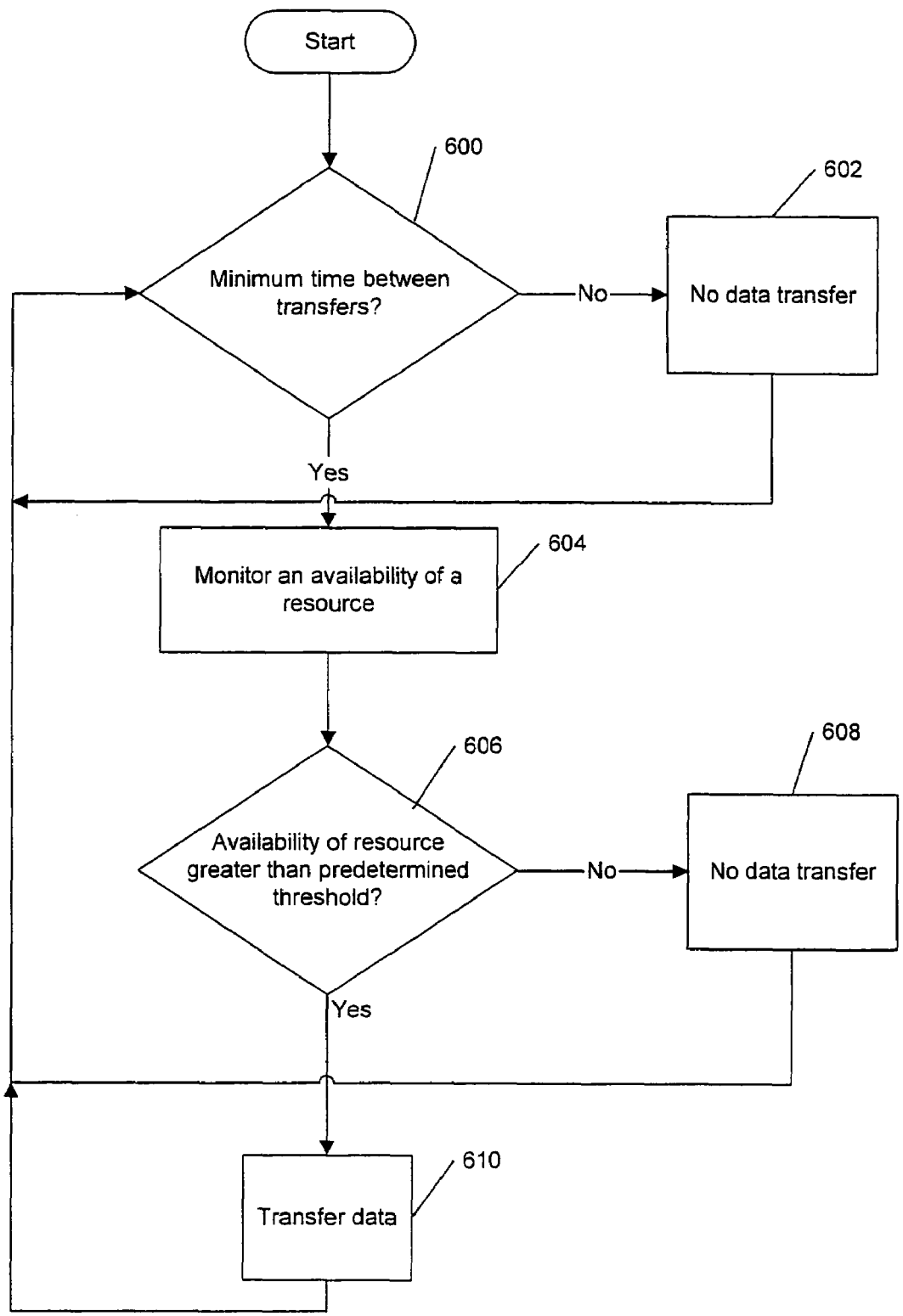

In some applications, the data transfer control module 260 can provide data transfers that have a minimum amount of time between transfers. There may be no advantage to performing data replication more frequently than a given amount, such as thirty or sixty minutes. Moreover, data replication performed too frequently may use system resources that could be available for other applications. Operations to provide a minimum time between transfers are shown in FIG. 6.

As shown, if a minimum time between transfers has not elapsed (Block 600), then no data transfer occurs (Block 602). However, if the minimum time between transfers has elapsed, then the data transfer control module 260 monitors an availability of a system resource (Block 604). If the resource availability is greater than a predetermined threshold, then data transfer operations are initiated (Block 610). If the resource availability is not greater than the predetermined threshold, then data is not transferred (block 608).

Figure 7:
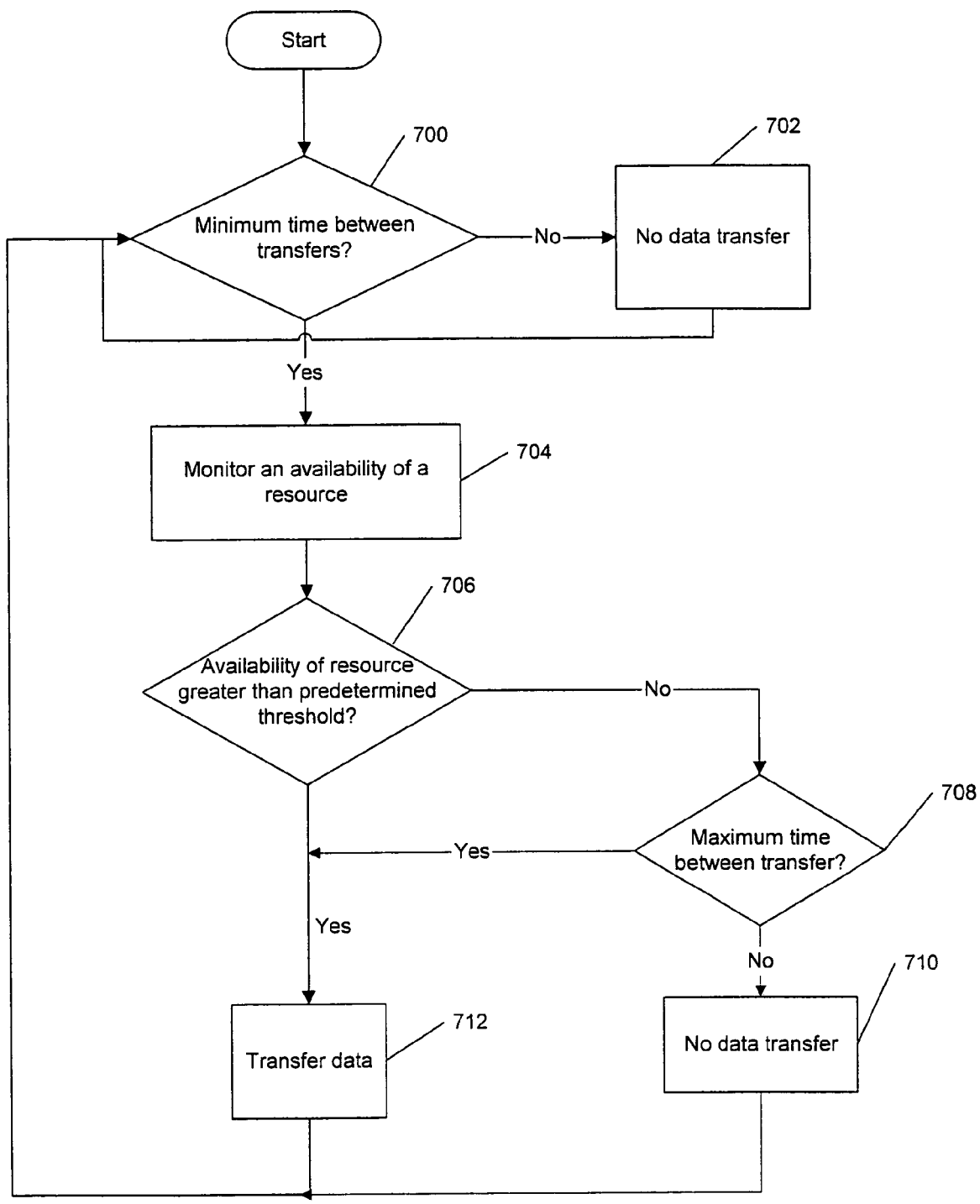

As shown in FIG. 7, the data transfer control module 260 can provide both a minimum and a maximum time in between data transfer operations. Accordingly, data transfer can occur based on resource availability, but also between a minimum and maximum time regardless of resource availability. If the minimum time between transfers has not elapsed (Block 704), then there is no data transfer (Block 702). After the minimum time between transfers has elapsed, then the data transfer control module 260 monitors the availability of a resource (Block 700). If the resource availability is greater than a predetermined threshold (Block 706), then data is transferred (Block 712). If the resource availability is not greater than the predetermined threshold (Block 706) and the maximum time between transfers has not elapsed (Block 708), then there is no data transfer. However, if the maximum time between transfers has elapsed (Block 708), then data is transferred (Block 712).

Figure 8:
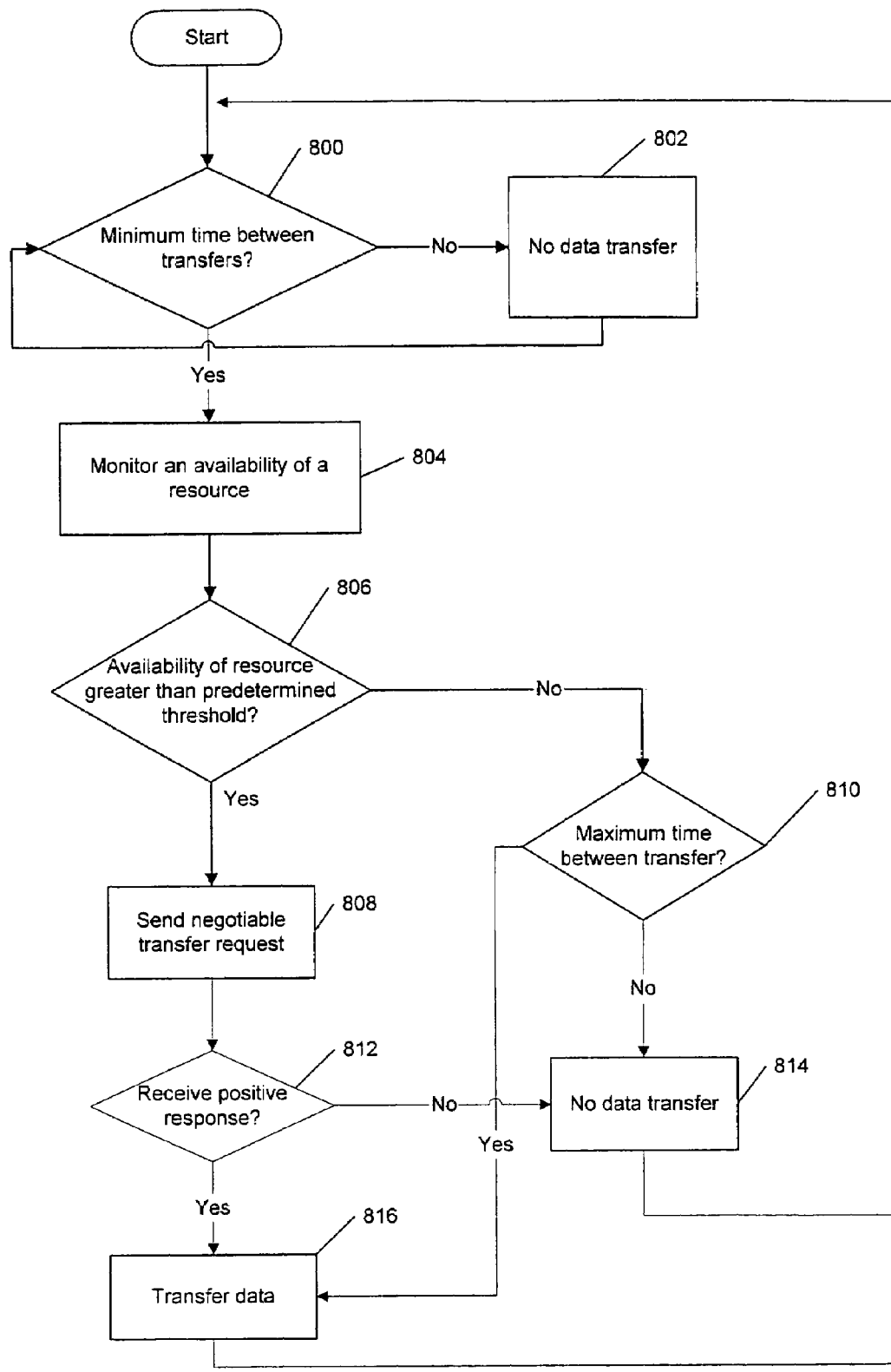

Communications between two or more processors or resources in the system can be used to determine the availability of a resource. As shown in FIG. 8, if a minimum time between transfers has elapsed (Block 800), then one processor or resource, such as a server 16 as shown in FIG. 1, can monitor an availability of a server resource, such as server memory, processor usage, and the like (Block 804). If the server resource availability is greater than a predetermined amount (Block 806), then a negotiable transfer request is sent, for example, from the server 16 to the client 12 (Block 808). The client 12 may send a response to the server 16 indicating whether the client has resources available for data transfer operations. If the response is positive (Block 812), then data is transferred (Block 816). If the response is negative, then data is not transferred (Block 814).

Accordingly, if the resource availability is greater than a threshold with respect to one processor, the processor can send a request to a second processor. The second processor can respond with either a positive or negative response, indicating that its resource availability is also greater than a selected threshold amount. The threshold amounts with respect to the various processors can be different or the same, and the resource availability queries can involve the same type of resource (memory usage, processor usage, bandwidth, etc.) or different types of resources or combinations of resources on the system.

As further shown in FIG. 8, additional operations can include controlling data transfers according to minimum and maximum times between transfers. If the minimum time between transfers has not been met (Block 800), then data transfers do not occur. (Block 802). If a maximum time between transfers has elapsed (Block 810), then data transfers occur (Block 816).

While the present invention has been described with reference to a client-server architecture, as will be appreciated by those of skill in the art, the present invention may be provided as a stand-alone application.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method for controlling the periodic data transfer between a first computer processor and a second computer processor, wherein the first computer processor and the second computer processor comprise a network system, the method comprising:

transferring data between the first and second computer processor based on an impact of the transfer on a dynamically determined measure of performance, wherein transferring data between the first and second computer processor based on an impact of the transfer on a measure of performance comprises, monitoring a real time availability of a system resource, and transferring data between the first and second computer processor based on a comparison of the availability of a system resource to a predetermined threshold; and transferring data between the first and second computer processor if a predefined maximum time between transferring data has elapsed irrespective of the availability of the system resource.

2. The method of claim 1, further comprising delaying the transfer of data until at least a predefined minimum time has elapsed after a prior data transfer.

3. The method of claim 1, further comprising sending a resource availability request from the first computer processor to the second computer processor to determine resource availability.

4. The method of claim 1, wherein transferring data between the first and second computer processor further comprises replicating data.

5. The method of claim 1, wherein transferring data between the first and second computer processor further comprises backing up data.

6. The method of claim 1, wherein the system resource is usage of the first and/or second computer processor.

7. The method of claim 1, wherein the system resource is memory usage of the first and/or second computer processor.

8. The method of claim 1, wherein the system resource is central processor unit (CPU) usage of the first and/or second computer processor.

9. The method of claim 1, wherein the system resource is an available bandwidth on a network connection.

10. A computer program product for controlling data transfer between a first computer processor and a second computer processor, wherein the first computer processor and the second computer processor comprise a network system, comprising:

a computer readable medium having computer readable program code embodied therein, the computer readable program code comprising:

computer readable program code which transfers data between the first and second computer processor based on an impact of the transfer on a dynamically determined measure of performance, wherein the computer readable program code which transfers data between the first and second computer processor based on an impact of the transfer on a measure of performance comprises, computer readable program code which monitors a real time availability of a system resource, and computer readable program code which transfers data between the first and second computer processor based on a comparison of the availability of a system resource to a predetermined threshold; and the computer readable program code further comprising computer readable program code which transfers data between the First and second computer processor if a predefined maximum time between transferring data has elapsed irrespective of the availability of the network resource.

11. The computer program product of claim 10, further comprising computer readable program code which delays data transfer until at least a predefined minimum time has elapsed after a prior data transfer.

12. A system for controlling data transfer between a first computer processor and a second computer processor, wherein the first computer processor and the second computer processor comprise a network system, comprising:

means for transferring data between the first and second computer processor based on an impact of the transfer on a dynamically determined measure of performance, wherein the means for transferring data between the first and second computer processor based on an impact of the transfer on a measure of performance comprises, means for monitoring a real time availability of a system resource, and means for transferring data between the first and second computer processor based on a comparison of the availability of a system resource to a predetermined threshold; and means for transferring data between the first and second computer processor if a predefined maximum time between transferring data has elapsed irrespective of the availability of the network resource.

13. The system of claim 12, further comprising means for delaying data transfer until at least a predefined minimum time has elapsed after a prior data transfer.

* * * * *